US006305656B1

United States Patent
Wemyss

(10) Patent No.: US 6,305,656 B1
(45) Date of Patent: Oct. 23, 2001

(54) MAGNETIC COUPLER AND VARIOUS EMBODIMENTS THEREOF

(75) Inventor: Roy D. Wemyss, Federal Way, WA (US)

(73) Assignee: Dash-It USA Inc., Federal Way, WA (US)

( * ) Notice: Subject to any disclaimer, the term of this patent is extended or adjusted under 35 U.S.C. 154(b) by 0 days.

(21) Appl. No.: 09/454,984

(22) Filed: Dec. 3, 1999

Related U.S. Application Data
(60) Provisional application No. 60/121,853, filed on Feb. 26, 1999.

(51) Int. Cl.$^7$ ..................................................... A47G 1/17
(52) U.S. Cl. ................................... 248/309.4; 248/206.5; 248/683; 220/628; 206/5
(58) Field of Search ............................... 248/311.2, 206.5, 248/346.11, 447.1, 205.2, 205.3, 346.03, 310, 349.1, 683, 309.4; 220/628, 592.17; 206/5, 565

(56) References Cited

U.S. PATENT DOCUMENTS

| | | | |
|---|---|---|---|
| D. 302,568 | * 8/1989 | Berger | D19/65 |
| 2,217,514 | * 10/1940 | Henry | 220/628 |
| 2,659,169 | 11/1953 | Brennan | 40/1.5 |
| 2,742,250 | 4/1956 | Cronberger | 248/206 |
| 2,876,359 | * 3/1959 | Plymale | 378/181 |
| 2,899,098 | * 8/1959 | Gits | 220/592.17 |
| 2,967,038 | 1/1961 | Lennemann | 248/205 |
| 2,977,082 | * 3/1961 | Harris | 248/206.5 |
| 3,013,688 | * 12/1961 | Luning | 215/376 |
| 3,085,777 | * 4/1963 | Lewtan et al. | 248/206.5 |
| 3,245,165 | 4/1966 | Podoloff | 40/129 |
| 3,307,740 | * 3/1967 | Fant | 221/45 |
| 3,350,045 | 10/1967 | Mayers | 248/205 |
| 3,365,684 | * 1/1968 | Stemke et al. | 335/302 |
| 3,524,614 | * 8/1970 | Sorth | 248/131 |
| 3,633,863 | * 1/1972 | Abbey | 248/346.11 |
| 3,713,614 | 1/1973 | Taylor | 248/205 |
| 3,809,353 | * 5/1974 | Good et al. | 248/346.11 |
| 3,827,020 | 7/1974 | Okamoto | 335/285 |
| 3,899,762 | * 8/1975 | Studders | 335/302 |
| 4,100,684 | 7/1978 | Berger | 35/62 |
| 4,287,676 | * 9/1981 | Weinhaus | 40/661.01 |
| 4,448,383 | * 5/1984 | Hansen | 248/447.1 |
| 4,452,354 | * 6/1984 | Tabachnick | 206/5 |
| 4,605,292 | * 8/1986 | McIntosh | 359/870 |

(List continued on next page.)

Primary Examiner—Anita King
(74) Attorney, Agent, or Firm—Kathleen T. Petrich

(57) ABSTRACT

A magnetic coupler having various holding device embodiments to be quickly magnetically coupled and uncoupled with an industrial strength magnetic base that is fixedly attached to a desired nonferrous surface, such as a dashboard of an automobile. The magnetic base includes a nonferrous low or soft durometer shell that encases the magnet. Preferably, the shell's outer surface is textured, which provides friction for superior magnetic coupling with a ferrous disk. If the device to be held is relatively heavy or has a high profile, the holding device/object to be held includes a support collar assembly that is fixedly attached to an external portion of the holding device. If the device to be held is light or has a low profile, a ferrous disk having a surface area of not less than $\frac{1}{10}^{th}$ the area of the surface area of the device surface to be magnetically coupled with the magnetic base is adhered to the device surface, unless the device has sufficient ferrous content to magnetically couple with the magnetic base. The holding device can be quickly coupled and uncoupled with the magnetic base in either the high profile or low profile embodiments. The high profile holding devices include a beverage cup holder, a clip, a clipboard, a paper/key/coin tray, an envelope holder, and a radar detector base. The low profile holding devices or devices to be held include a hand held computer, a calculator, a cellular phone, and an eyeglass holder.

41 Claims, 11 Drawing Sheets

U.S. PATENT DOCUMENTS

| | | | |
|---|---|---|---|
| 4,646,856 | * | 3/1987 | Dismukes .............................. 175/107 |
| 4,678,150 | | 7/1987 | Newman et al. .................... 248/205 |
| 4,815,683 | * | 3/1989 | Ferrante ............................ 248/205.2 |
| 4,848,584 | * | 7/1989 | Windorski ............................ 206/565 |
| 5,031,874 | | 7/1991 | Shannon ............................... 248/683 |
| 5,039,047 | | 8/1991 | Pitzo .................................... 248/206 |
| 5,186,350 | * | 2/1993 | McBride ............................. 220/739 |
| 5,288,048 | * | 2/1994 | Shriener ............................... 248/251 |
| 5,405,004 | * | 4/1995 | Vest et al. ............................ 206/350 |
| 5,494,249 | * | 2/1996 | Ozark et al. ...................... 248/311.2 |
| 5,641,140 | * | 6/1997 | Sorenson ............................ 248/25.3 |
| 5,813,583 | * | 9/1998 | Benedeti ............................. 224/483 |
| 5,947,439 | * | 9/1999 | Florey ................................. 248/683 |
| 5,992,807 | * | 11/1999 | Tarulli ............................... 248/206.5 |
| 6,039,173 | * | 3/2000 | Crow ....................................... 206/5 |

\* cited by examiner

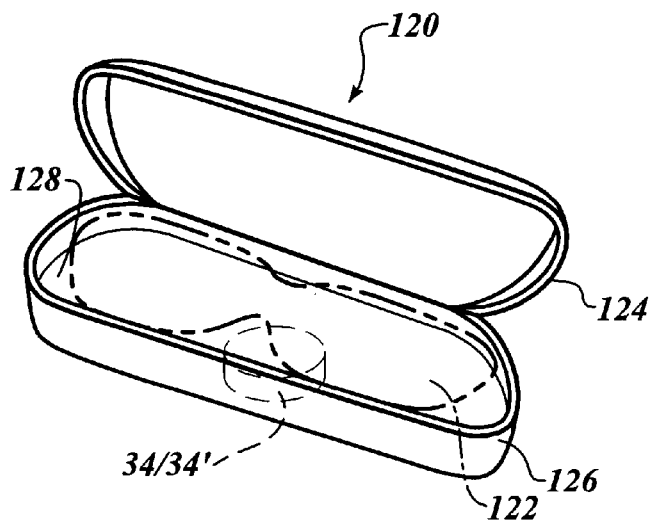
*Fig. 13*
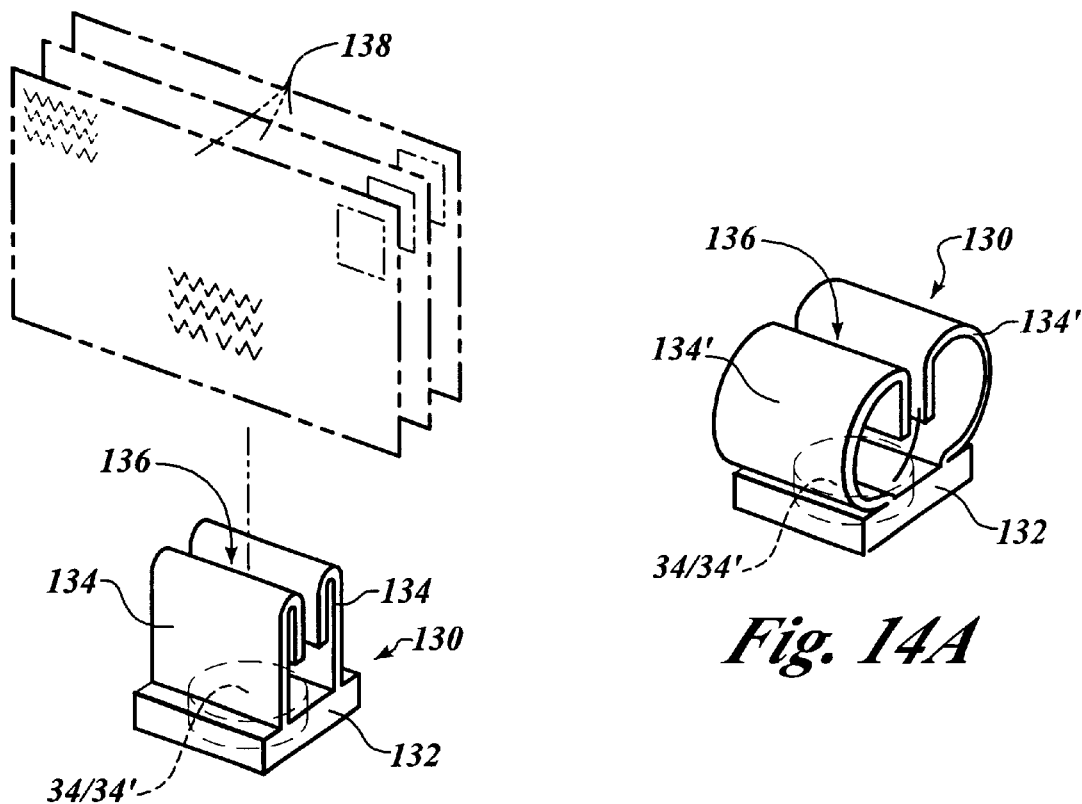
*Fig. 14A*
*Fig. 14*

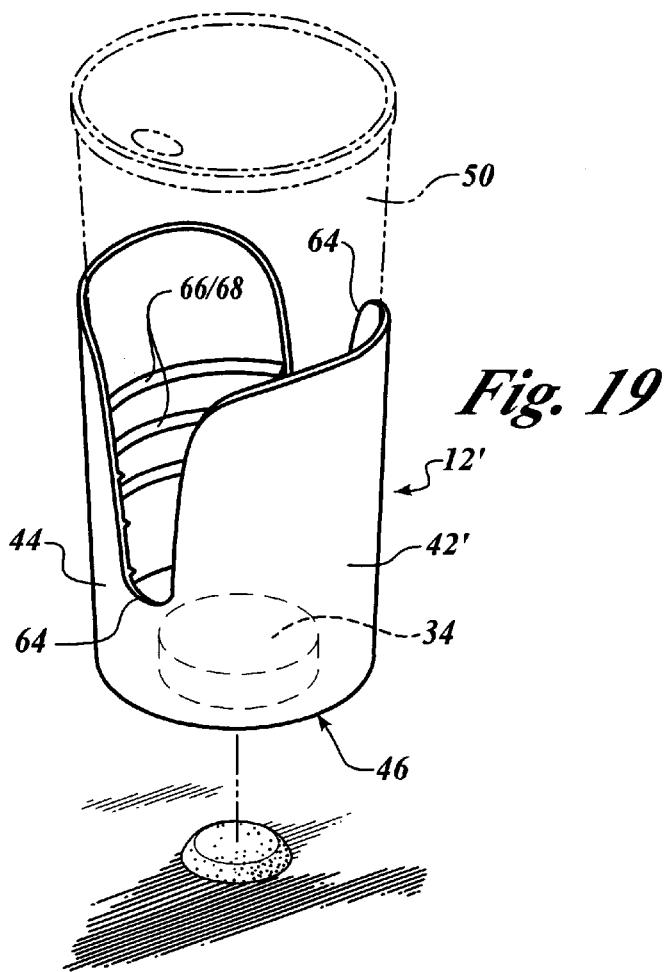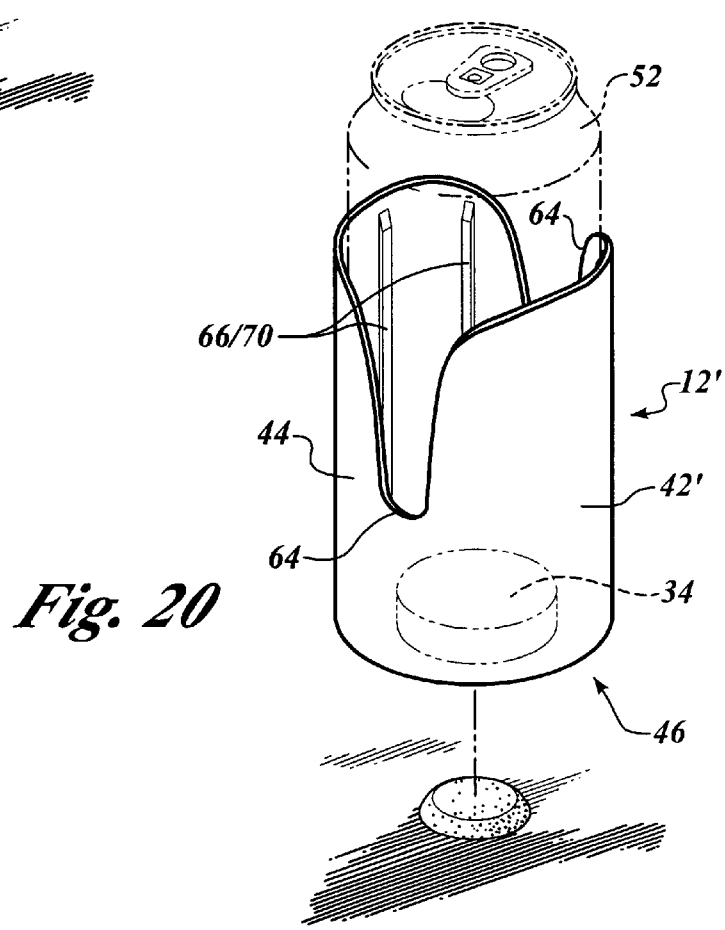

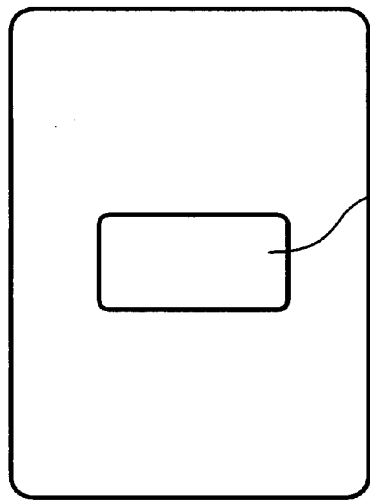
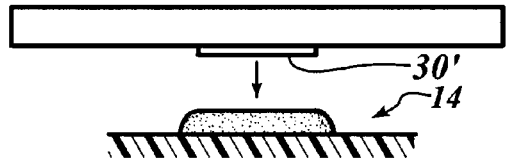
Fig. 25
Fig. 26
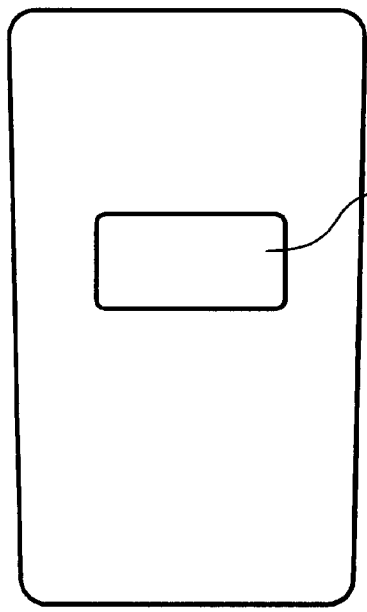
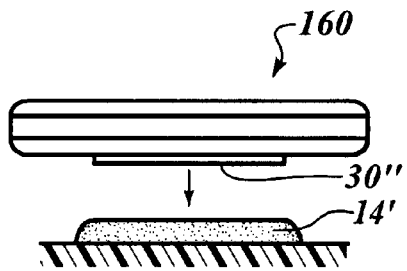
Fig. 27
Fig. 28

MAGNETIC COUPLER AND VARIOUS
EMBODIMENTS THEREOF

RELATED APPLICATION

This application claims priority to U.S. provisional patent application Ser. No. 60/121,853, filed Feb. 26, 1999, and entitled "Magnetic Coupler and Various Elements Thereof."

TECHNICAL FIELD

The present invention is generally related to magnetic coupling devices. More specifically, the invention is directed to a variety of holding devices that magnetically couple with a magnetic base, where each holding device can quickly couple with the magnetic base for securing the holding device to a nonferrous surface, such as a dashboard, as well as quickly uncouple from the magnetic base in order to access to the holding device or to change to a different holding device.

BACKGROUND OF THE INVENTION

We live in an age where our car is far more than a mode of transportation. For many, our cars are a second office. Longer commutes mean that we need ready access to our coffee cups, notepad and paper, sunglasses, hand-held computers (e.g. a PALM PILOT) and the like. Although many automobile manufacturers have provided space for more items, many new vehicles, and most older vehicles, still lack an appropriate space to hold necessary articles.

We also live in an age where we need access to certain devices, such as a cellular phone, while we are driving. However, it has been recognized that driving while the driver is holding a cellular phone to the driver's ear has, in certain cases, met with disaster. Some states and some local municipalities have mandated "hands free" cellular phone usage when driving a motorized vehicle. Although installed car phones are still obtainable, they are much less practical in that they do not provide portability. Additionally, the installed car phones are more expensive than portable cellular (or digital) phones. More often, the user carries the cellular phone with him or her wherever he or she goes, including in and out of a motorized vehicle.

Magnetic couplers, or holders, have been known to secure items such as a medallion to metal plates on car dashboards. However, most cars today contain dashboards and various interior components that are made from man-made materials (e.g. plastics). As such, traditional magnetic couplers do not work, as they will not magnetically bond to a non-ferrous surface.

Moreover, the coupled devices, including cellular phones, have not been known to be sufficiently secured to a magnetic base (and ultimately the surface to which the holding device is to be secured) or that the coupling was too strong to readily uncouple the magnetic coupler in order to access or change the coupled device.

An object of the present invention is to provide an improved magnetic coupler that can hold a variety of ferrous and nonferrous articles to a non-ferrous structure, such as a car dashboard. Another object of the present invention is to provide a variety of embodiments of magnetic coupling devices that can accommodate a variety of nonferrous useful articles, typically used in a car, to secure the nonferrous useful article to a car dashboard. Another object is to have both a quick and secure coupling and a quick and easy uncoupling features such that the holding devices may be readily accessed when desired, or easily changed to another holding device, yet, remain securely coupled to the magnetic base until the uncoupling of the holding device from the magnetic base is desired by the user. Another object is to provide hands free use of a portable cellular phone when the owner/user of the cellular phone is driving.

SUMMARY OF THE INVENTION

The present invention is directed to a magnetic coupler that comprises a magnetic base and a holding device or an object to be held to the magnetic base. The magnetic base includes an industrial strength magnet where at least the upper portion of the magnet is encased in a low durometer nonferrous shell. The shell includes an external surface of a size and shape to engage a corresponding surface of the holding device. The magnet includes a lower portion that is fixedly attached to a desired surface. The holding device is of a size and shape to hold at least one personal object. The holding device includes an external surface having a ferrous disk or plate that is of a size and shape to quickly magnetically couple and quickly uncouple the holding device's external surface via the ferrous disk with/from the magnetic base's shell external surface.

According to one aspect of the present invention, the shell's low durometer external surface is textured to provide a soft, high friction surface. This soft, high friction surface makes superior contact directly with a ferrous disk that is attached directly to an object to be stationarily held to the magnetic base, as opposed to a holding device. The surface area of the ferrous disk should not be less than ¹⁄₁₀th the surface area of the object's surface to be magnetically coupled with the magnetic base. In preferred form, the ratio of the ferrous disk surface area to the overall surface area of the object's surface to magnetically couple with the magnetic base is approximately 4–6:1. This alternative works best when the object to be held has a low profile and is not relatively heavy. Examples of such low profile devices include: hand-held computers, cellular phones, calculators, eyeglass holders, remote control devices (such as for a television or garage door), and MP3 digital recorders. Here, to optimize a strong magnetic coupling and easy uncoupling, the ferrous disk may have a thickness in the range of 30/1000–50/1000 of an inch.

If the holding device has a high profile or is relatively heavy, a support collar assembly that is fixedly attached to an external surface of the holding device supports the ferrous disk. The support collar assembly allows quick coupling and quick uncoupling of the holding device relative to the magnetic base without risk of the ferrous disk being dislodged from the holding device. The support collar assembly is fixedly attached to and external of an external surface of the holding device. The support collar assembly includes at least one side wall that is fixedly attached to the external surface of the holding device and a lip fixedly attached to the side wall and the lip projects inwardly of the side wall. The lip projects inwardly of the side will to form a ledge in which the ferrous disk is seated. The lip and the side wall below the lip define an opening that is of a size and shape corresponding to the shape of the upper portion of the magnetic base. The ferrous disk is of a size and shape to be received within the support collar assembly seated atop the lip/ledge and confined by the side wall and the external portion of the holding device.

In preferred form, the support collar assembly is cylindrical with an annular ledge acting as the lip. This shape corresponds to a substantially frusto-conical-shaped magnetic base. According to another aspect of the invention, the holding device includes a cylindrical side wall, which is also fixedly attached to and external of the external surface of the holding device. The cylindrical side wall is adhered to the side wall of the support collar, with the ferrous disk encased there between, the lip, and the external surface of the holding device.

There are many holding devices claimed in the present invention. A first holding device is a beverage cup holder is a cup having a substantially cylindrical side wall and a planar bottom wall that together define an opening of a size and shape to receive a beverage container. The support collar assembly, described above, is fixedly attached to the external side of the planar bottom wall. The side wall of the beverage cup holder may include upper portions that are outwardly flared. Additionally, at least one longitudinal rib may extend inwardly of the side wall into the opening of the cup. The combination of the flared upper side wall and the at least one longitudinal rib provides maximum flexibility in which the beverage cup holder can accommodate a large variety of beverage containers—from conventional paper coffee cups to aluminum cans. Moreover, the cup side wall may include a plurality of longitudinally-oriented, spaced-apart grooves on the cup's outer surface. The grooves provide heat dissipation for holding hot beverages as well as a better grip to hold the cup. Last, the side wall of the cup may extend past the planar bottom wall to be coplanar with the bottom of the side wall of the collar assembly for a neater appearance and to make the bottom of the side wall essentially adjacent the surface to which the magnetic base is fixedly attached. This overhang provides less access to support collar assembly for accidental uncoupling.

Another variation of the beverage container holder includes a pair of oppositely situated, elongated grooved slots cut within the side wall of the cup. Here, the flared side wall upper portions are missing. This embodiment of the beverage cup holder may include a plurality of laterally-oriented or longitudinally-oriented, spaced apart ribs that extend inwardly of the cup side wall. The elongated grooved slots and the inwardly directed ribs provide flexibility in accommodating a variety of beverage containers, similar to those discussed in the first beverage cup holder embodiment.

Because the ferrous disk and magnet are strongly magnetically attracted to each other, and that the opening of the support collar assembly below the ferrous disk and lip is of a size and shape to conform with the upper portion of the magnetic base, the beverage cup holder can be easily and quickly coupled to the magnetic base by placing the opening of the support collar over the upper portion of the magnetic base. To quickly and easily uncouple the support collar assembly, and thereby the holding device, from the magnetic base, one "end" of the support collar is tilted in an angle from the plane of the surface to which the magnetic base is fixedly attached. This is accomplished by tilting a portion of the holding device with the support collar attached to that portion of the holding device.

Other holding devices of the present invention include a clip in which to hold papers and the like, a clipboard, a radar detector base, a notepad/paper/coin/key tray, an eyeglasses/sunglasses holder, a letter holder, a tissue box holder, and a personal electronic holding device.

According to other aspects of the invention, the magnetic base shell, the collar assembly, and the holding devices are preferably dark in color or made from a non-reflective color. This is helpful if the magnetic coupler is used on a dashboard of an automobile as light-reflective color or material could distract drivers. Another alternate embodiment, however, could add a glow-in-the dark feature to the magnetic outer shell for easy access in low ambient light. Additionally, the magnetic base may be oblong in shape to accommodate a larger or two side-by-side magnets for heavier applications. Moreover, the magnet should be at least at a rating of 2.0 Gauss.

According to yet another aspect of the invention is a kit form of the magnetic base, as discusses above. Here, however, the magnetic base also further includes a second ferrous disk assembly. The second ferrous disk assembly includes a second ferrous disk and its own removable protective film with a layer of adhesive sandwiched between the second ferrous disk and the protective film. The second ferrous disk assembly is removably attached to the magnetic base so that virtually any household holding device or object can be adhered to the second ferrous disk and be coupled with the magnetic base.

These and other features and benefits will be discussed in further detail in the various figures of the attached drawing, the Brief Description of the Drawing, and the Best Mode for Carrying Out the Invention.

BRIEF DESCRIPTION OF THE DRAWING

Like reference numerals are used to designate like parts throughout the several views of the drawing, wherein:

FIG. 13 is a perspective view of a fifth alternate holding device embodiment disclosing a eyeglasses/sunglasses holder, of which a pair of eyeglasses is shown in phantom;

FIG. 14 is a perspective view of a sixth alternate holding device embodiment disclosing an upright letter/paper holder with a plurality of letters shown in phantom;

FIG. 14A is a perspective view of an alternate embodiment of the holding device of FIG. 14;

FIG. 19 is a perspective view of a first variation of the cup holder of FIGS. 2–5, shown with a coffee cup shown in phantom received in the cup holder;

FIG. 20 is a perspective of a second variation of the cup holder of FIGS. 2–5, shown with a conventional aluminum can shown in phantom received in the cup holder;

FIG. 25 is a rear view of the calculator of FIG. 17 shown with a ferrous disk of approximately ¼th the area of the rear surface area of the calculator and adhered to the rear surface of the calculator;

FIG. 26 is a side elevational view of the calculator of FIG. 25 shown magnetically coupling with the magnetic base of FIG. 16;

FIG. 27 is a rear view of the hand held computer of FIG. 18 shown with a ferrous disk of approximately ⅙th the area of the rear surface area of the hand held computer and adhered to the rear surface of the hand held computer; and FIG. 28 is a side elevational view of the hand held computer of FIG. 27 shown magnetically coupling with the magnetic base of FIG. 18.

BEST MODE FOR CARRYING OUT THE INVENTION

Figure 1:
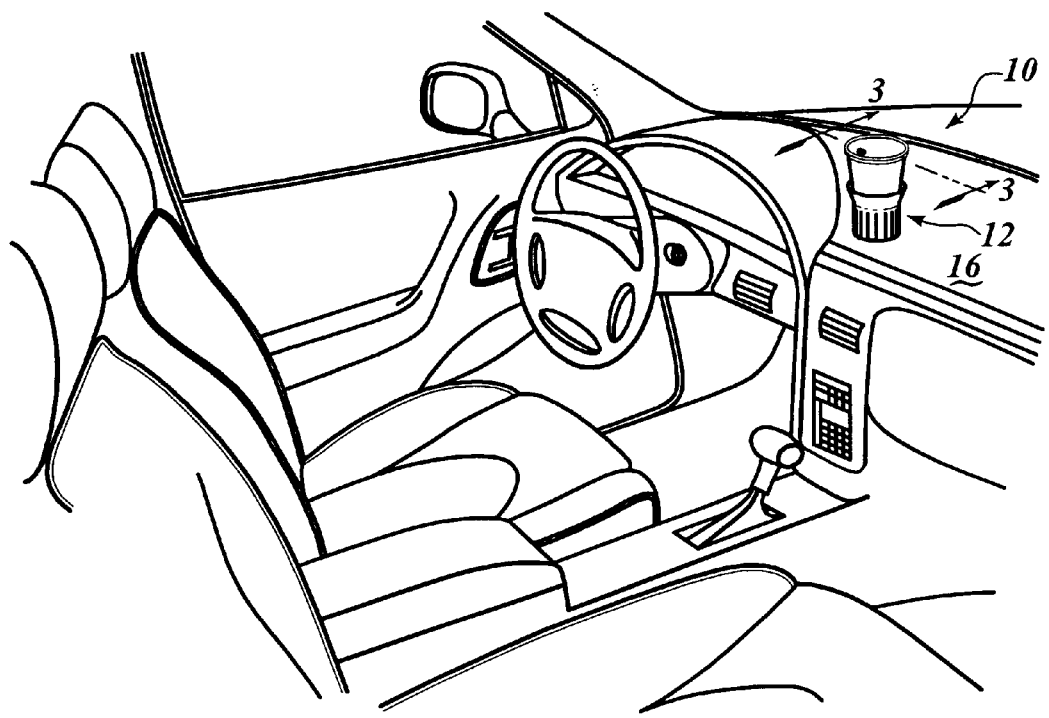
FIG. 1 is a perspective view of one embodiment of the holding device (a beverage container holder) of the present invention coupled to a magnetic base, which is adhered to a dashboard of an automobile.

The present invention is broadly related to magnetic couplers 10, in which an object (here, a holding device or the held device itself) is magnetically coupled to a magnetic base. Referring to FIG. 1, a first embodiment holding device, a beverage cup holder, 12 is magnetically coupled to a magnetic base (better shown as 14 in FIG. 2), which may be adhered to a nonferrous surface 16. As illustrated, the magnetic base is adhered to a conventional dashboard of an automobile.

Referring to all of the views (FIGS. 1–28), and particularly to FIGS. 2–6, consistent with all of the embodiments, each holding device 10 is coupled to magnetic base 14 through an industrial strength magnet 18. Magnet 18 is preferably at least 2.0 Gauss, and preferably a 2.7 Gauss rare earth magnet, such as a Neo. 37 or equivalent. The magnet 18 is encased in a nonferrous shell 20. The upper portion 22 of shell 20 forms a "boot" around the magnet 18. The upper portion 22 is made of a low (or soft) durometer material, such as SBR40 rubber, neoprene, or other flexible composite material. The upper portion "boot" includes a high friction, textured outer surface 24. The soft durometer textured surface provides a "non skid" surface in which devices are magnetically coupled. Such texture can take the form of scoring, dimpling, or combination of the two. The magnetic base soft durometer shell is preferably a dark, non-reflective color. The SBR40 black color rubber is ideal so as to not reflect when installed on an automobile dashboard. A reflective shell is preferably avoided as a reflective shell could reflect light during driving and cause distraction for a driver of the automobile.

Figure 2:
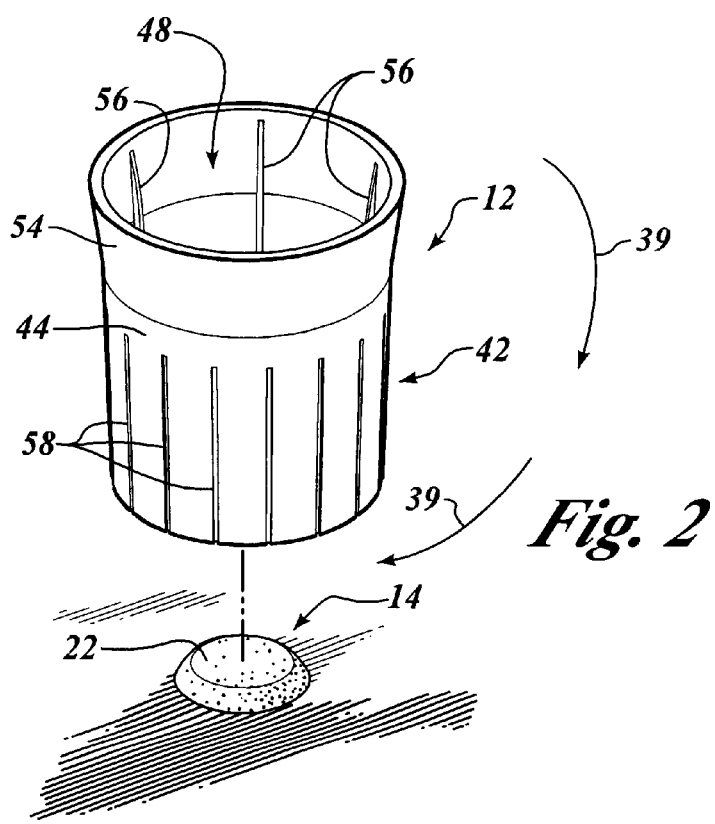
FIG. 2 is an exploded perspective view of the beverage container holder shown prior to coupling the magnetic base.

According to one aspect of the invention, the magnetic base may have a circular perimeter shape. In conjunction with the circular perimeter shape, the shell may be substantially frusto-conically shaped. The upper portion may include a substantially planar circular top that has a smaller diameter than the circular base perimeter. This can best be seen in FIGS. 2–7, 11, 16–17, 19–20 and 22 and 24. As discussed below, the circular, frusto-conical shape of the shell may allow the holding device to rotate or "swivel" about the magnetic base depending on the embodiment of the holding device. This is illustrated in FIG. 2 by showing swiveling movement in the direction of arrow 39. The holding device 12 can just as easily swivel in the opposite direction of arrow 39, as well. Additionally, the frusto-conical shape with the circular periphery allows access to the magnetic base from any direction.

Figure 18:
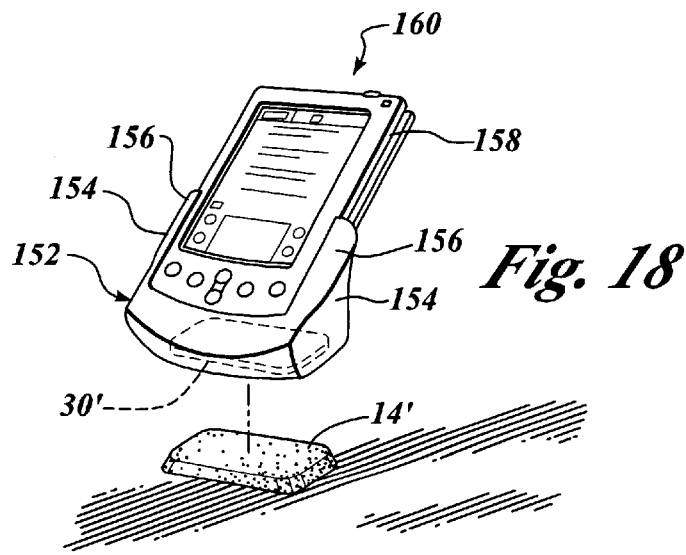
FIG. 18 is a perspective view of a eighth alternate holding device embodiment of a hand-held computer holder shown holding a hand held computer, and being mounted to a second alternate embodiment magnetic base.

According to another aspect of the invention, the magnetic base may be oblong in shape, such as the magnetic base 14' shown in FIGS. 18, and 28. The oblong shape allows for a larger magnet 18 or two side-by-side magnets. This is particularly useful when the magnetic base is used to hold a low profile but relatively delicate/fragile object. This particular application will be discussed further in detail below.

The shell 20 may also includes a lower ferrous disk 26, positioned underneath the magnet 18. In tests, the addition of the lower ferrous disk 26 makes the magnet more powerful (stronger magnetic flux flow) when a ferrous object is positioned above the magnetic base's upper portion of the shell. Moreover, the ferrous disk allows the magnetic base to be coupled to a magnetized surface As best shown in the enlarged view of FIG. 6, the rubber boot 22 slopes downwardly from the uppermost outer surface 24 and covers the magnet 18 and the perimeter of the lower ferrous disk 26. In preferred form, the now encased magnet 18 includes a layer of adhesive with a removable protective film 28. When the protective film 28 is removed and the adhesive layer is exposed, the magnetic base 14 can be permanently positioned to any clean, dry surface 16, such as a mirror, wall, or a dashboard, as discussed. The magnetic base may be attached to a horizontal or vertical surface or some variation there between.

Certain objects, in which it is desired to have such objects stationary and secured to the certain location, contain sufficient amount of ferrous material to be magnetically coupled directly to magnetic base 14. This can be seen in FIGS. 16 and 17 where a cellular phone and calculator may have sufficient ferrous properties to secure the cellular phone or calculator directly to magnetic base 14. However, it is more likely that ferrous material must be added to the holding device in order to form the requisite ferrous-to-magnet attraction that couples the holding device to the now stationary magnetic base.

To that end, as most of the holding device embodiments of the present invention do not inherently contain ferrous material, a ferrous disk 30, 30', 30" such as a metal washer or plate, is added to an external portion of each holding device or object to be held. The ferrous disk 30 may be attached to an external portion 32 of the holding device or object to be held by an adhesive or other well-known attachment means. Because the magnetic base includes a strong industrial magnet, the holding device or object to be held is securely connected to the magnetic base when the ferrous disk of the holding device is magnetically coupled with the magnetic base as shown in FIG. 1.

The ferrous disk is generally sized to optimize the magnetic bond between the object to be held or the holding device and the magnetic base. The thicker the ferrous disk, the stronger the magnetic bond is between the ferrous disk and the magnetic base. However, it is an object of the present invention to have the object that is held or the holding device be magnetically bonded to the magnetic base and also be readily removed from the magnetic base when desired. The uncoupling of the object or holding device may be desired for access to the device itself or to change the type of held device. Thus, the thickness of the ferrous disk is to be optimally matched to the particular weight of the particular object to be held or holding device.

Optimal matching the ferrous disk size to the holding device or object to be held depends on whether the holding device or object to be held has a high profile or low (shallow) profile. A high profile device is one in which the center of gravity is approximately greater than five times the height of the magnetic base (shown as x in FIG. 5). However, the ultimate distribution of the weight of the holding device and contents will affect the center of gravity. Examples of high profile devices are shown in FIGS. 1–5, 11, 14–14A, and 18–20. Low or shallow profile examples are shown in FIGS. 16–17, and 21–28. FIGS. 7–10, 12–13, and 15 can be either profile depending on the ultimate weight distribution relative to the size of the magnetic base.

Referring particularly to the high profile embodiments of FIGS. 1–5, 11, 14–14A, and 19–20, the optimal matching is obtained through the use of a support collar assembly 34 of a size and shape to receive the ferrous disk 30. Here, the support collar assembly allows the necessary holding function for the relatively thicker ferrous disk 30, but also provides the necessary support when uncoupling the holding device or object to be held from the magnetic base without the risk of detaching the ferrous disk from the holding device or object to be held due to a poor adhesive bond.

It should also be noted that low profile devices can always utilize the support collar assembly 34, as discussed above, but the collar may add unnecessary profile to the portable device that may be designed to be lightweight and compact in size. The collar assembly may also add extra manufacturing costs.

Figure 3:
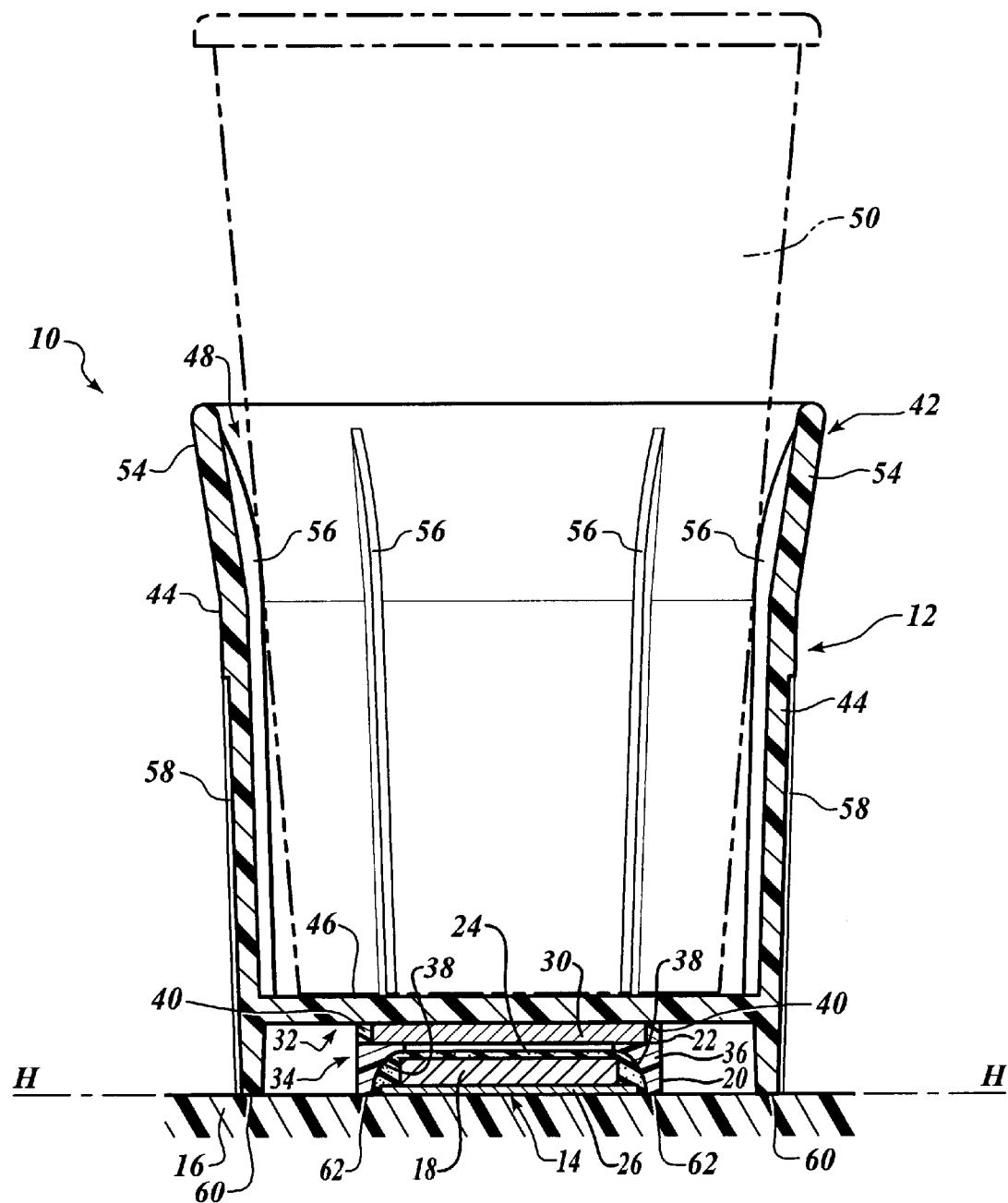
FIG. 3 is an enlarged section view taken substantially along lines 3—3 of FIG. 1 of the beverage container holder coupled with the magnetic base and with the beverage cup shown in phantom.
Figure 4:
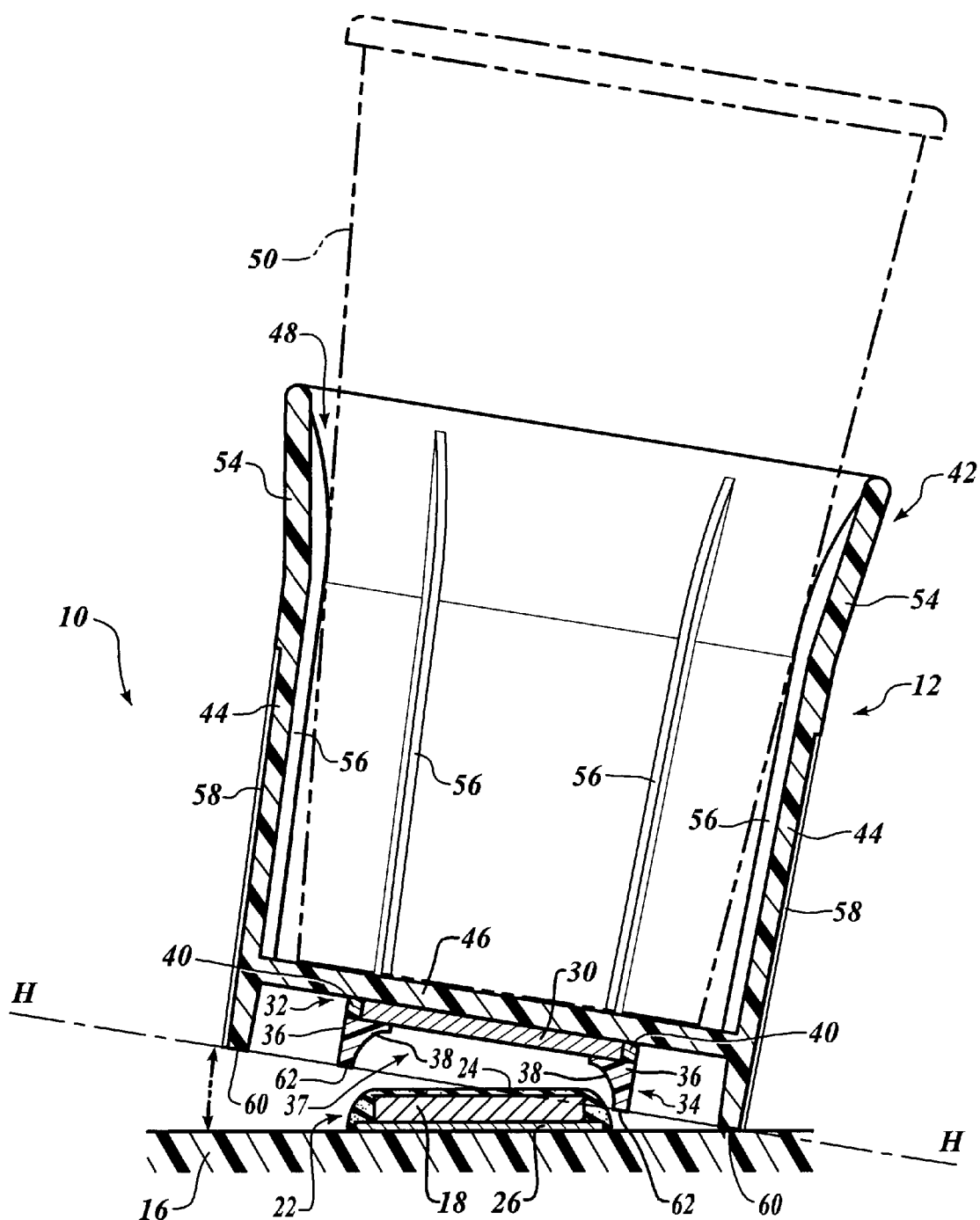
FIG. 4 is a view like FIG. 3 except showing the preferred way to quickly uncouple the holding device from the magnetic base.
Figure 5:
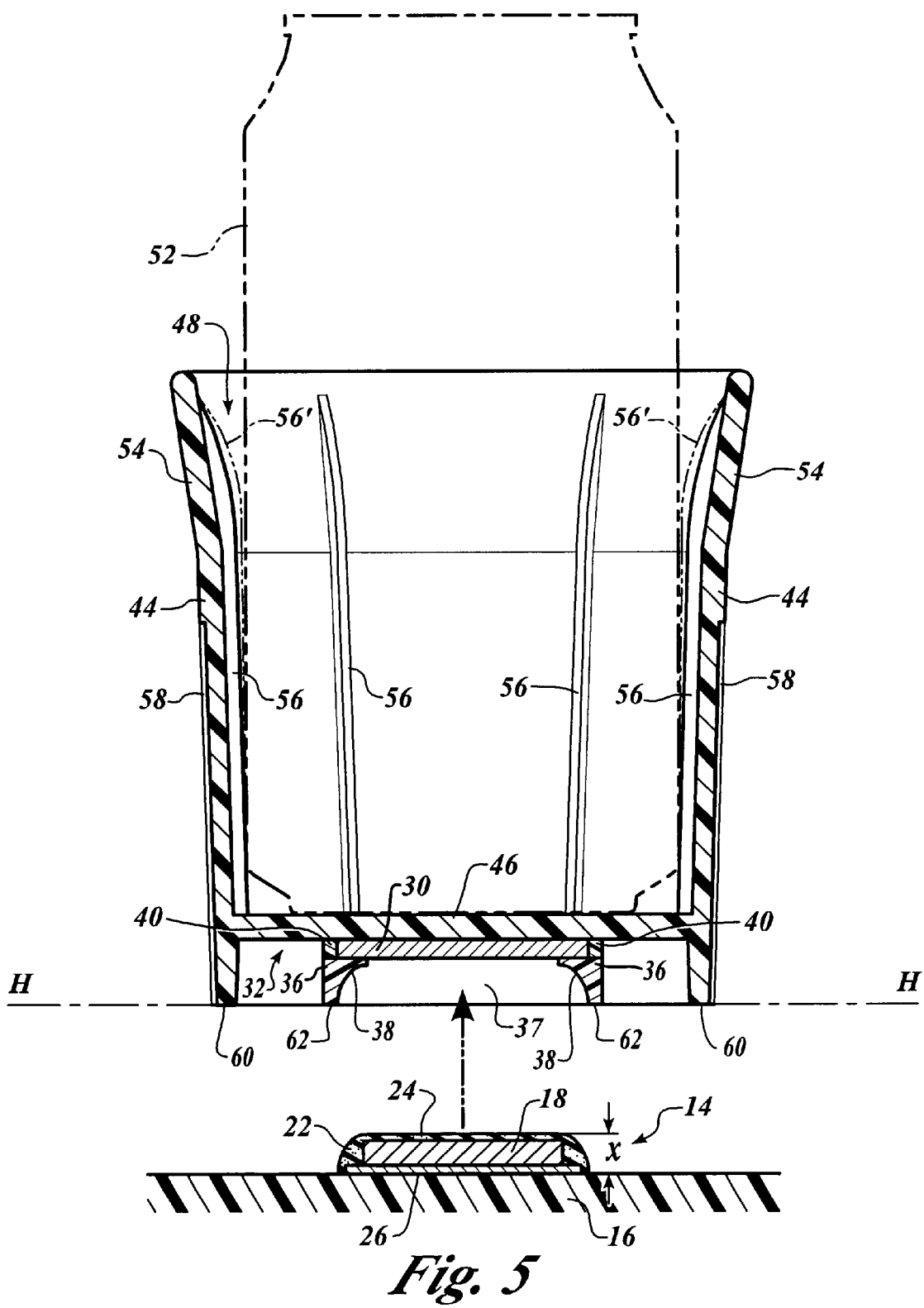
FIG. 5 is a view like FIG. 3 except better showing the preferred way to quickly couple the holding device having a ferrous disk and a support collar assembly to the magnetic base.

As best shown in FIGS. 3–5, the collar assembly 34 includes a side wall 36 that includes an integral inwardly extending lip 38. The lip forms a ledge of the interior of the side wall 36. In preferred form, as shown, the collar assembly is a substantially cylindrical ring with an annular lip/ledge extending inwardly of the cylindrical ring. The cylindrical ring is designed to correspond to the size and shape of the magnetic base's upper portion. The corresponding shapes provide inherent matability between the magnetic base upper portion and the support collar assembly. The corresponding shapes also provide that the support collar assembly, and therefore the holding device, can swivel about the magnetic base when joined.

The ferrous disk 30 is securely seated within the confines of the collar assembly 34 between the side wall 36 and the lip/ledge 38 and the external surface of the holding device or object to be held. Preferably, the ferrous disk 30 is of a thickness of 118/1000" to 135/1000", which is roughly ⅛ inch. However, if the holding device is light in weight, a thinner ferrous disk may be used instead to optimally match the ferrous disk to the magnet within the magnetic base. In this manner, the ferrous disk 30 is designed to have sufficient ferrous material to adequately attract the magnetic flux of magnet 18 of magnetic base 14.

Because the majority of the holding device embodiments of the present invention are made from a molded plastic or other man-made material for strength, durability, lightness, color (to be discussed below), and cost/ease in manufacturing a complex shape, the support collar is preferably made from plastic. The term "plastic" used herein is broadly construed to include any man-made material. This is because the ferrous disk cannot be molded into the holding device or support collar assembly, but is assembled into the collar assembly after any injection molding takes place. Because the coefficient of expansion will likely break the adhesive bond in a metal to plastic application, the support collar side wall 36 may be adhered to a molded side wall 40 on the external portion of the holding device. The ferrous disk is sized to fit between the side wall 40. The side wall 40 abuts the ferrous disk 30 from the sides, while the side wall 36/lip 38 abuts the lower surface of the ferrous disk.

Referring particularly to FIGS. 4–5, the opening 37 defined by the collar assembly 34 under lip/ledge 38 and by and between the side wall 36 is of a size and shape to receive upper portion 22 of shell 20. The magnet 18 of magnetic base 14 emits a strong magnetic flux flow to magnetically couple ferrous disk 30. In this way, the upper portion top surface 24 is magnetically coupled with the ferrous disk, even if there is a relatively thin air gap between the ferrous disk 30 and the magnetic base 14. The collar assembly 34, which is securely affixed to the holding device, keeps the holding device from any movement relative to the magnetic base, as best shown in FIG. 3. Thus, the item that is desired to be held, such as a cup of hot coffee, is strongly secured to the surface to which the magnetic base is secured.

As already discussed above, the magnetic force is such that the coupling of the base and the holding device (magnet 18 and ferrous disk 30) is a strong one to break. Thus, referring to FIG. 4, the support collar assembly and lip/ledge can be quickly decoupled from the magnetic base by tilting a portion of the holding device and collar assembly in the direction of the surface 16 to which the magnetic base 14 is attached. The downward force (as shown in FIG. 4) causes the other "side" of the holding device/support collar assembly to rise upwardly in an angle relative to the plane of surface 16. In this way the magnetic attraction between the ferrous disk 30 and the magnet 18 in base 14 is quickly and readily broken.

Figure 21:
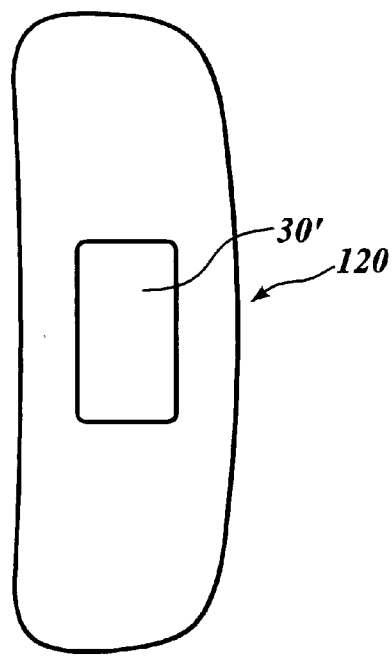
FIG. 21 is a rear view of the eyeglass holding device of FIG. 13 shown with a ferrous disk of approximately ⅕th the area of the rear surface area of the eyeglass holding device and adhered to the rear surface of the eyeglass holding device.
Figure 22:
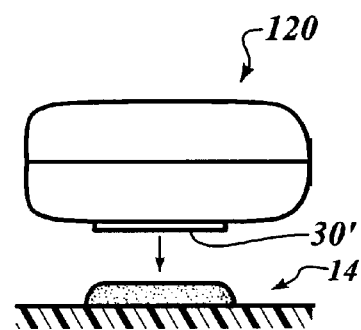
FIG. 22 is a side elevational view of the eyeglass holding device of FIG. 21 shown magnetically coupling with the magnetic base of FIG. 16.
Figure 23:
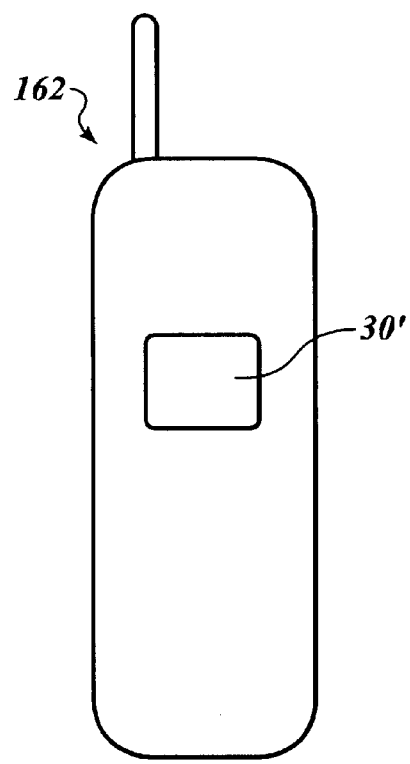
FIG. 23 is a rear view of the cellular phone of FIG. 16 shown with a ferrous disk of approximately ⅙th the area of the rear surface area of the cellular phone and shown adhered to the rear surface of the cellular phone.
Figure 24:
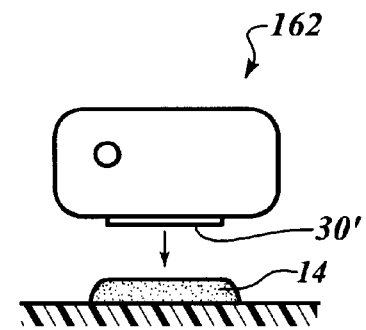
FIG. 24 is a side elevational view of the cellular phone of FIG. 23 shown magnetically coupling with the magnetic base of FIG. 16.

Low profile devices having a low profile and are not relatively delicate, heavy, or large can couple directly to soft, textured shell of the magnetic base through the addition of a ferrous disk. Referring to FIGS. 21–28, a ferrous disk 30' or 30" having a thickness in the range of approximately 30/1000–70/1000 of an inch is fixedly attached (e.g. adhered) to the external surface of the device that is to be magnetically coupled with the magnetic base. In preferred form, a thickness of 50/1000 of an inch has been tested with optimal results. The soft, textured shell provides sufficient friction to strongly hold the low profile device to the magnetic base. The surface area of the ferrous disk 30', 30" should not be less than ⅒th the surface area of the external surface of the holding device to which the ferrous disk is adhered. Preferably, the ratio of the surface of the ferrous disk to the external surface of the holding device is in the range of 4–6:1. The ferrous disk 30' of the eyeglasses case in FIG. 21 is approximately ⅕th the area. FIG. 22 shows a side elevational view of the ferrous disk 30' adhered to the eyeglasses holder 120 being magnetically coupled to magnetic base 14. Likewise, the cellular phone 162 of FIG. 23 is shown with a ferrous disk 30' of approximately ⅙th the surface area of the rear of the cellular phone and the calculator 164 of FIG. 25 is shown with a ferrous disk 30' of approximately ¼th of its rear surface. FIG. 27 shows a larger ferrous disk 30" adhered to the rear surface of a hand-held computer 160. Because the hand-held computer 160 is heavier than the cellular phone 162, a larger magnetic base 14' (such as shown in FIG. 18) may be used.

The present invention includes a variety of holding devices. Referring to FIGS. 2–5, and to FIGS. 19–20, a first embodiment of the holding device is the beverage cup/can holder 12. The beverage cup/can holder includes a cup 42' having a substantially cylindrical side wall 44 and a planar base 46 that defines an opening 48 of a size to hold a conventional coffee cup 50 (shown in phantom in FIGS. 3 or 4) or conventional aluminum can 52 (shown in phantom in FIG. 5). In preferred form, the beverage cup/can holder 12 is made from a rigid, yet resilient, lightweight man-made material.

In one preferred embodiment of the beverage holding device of FIGS. 2–5, the side wall 44 includes an upwardly and outwardly extending flared side wall portions 54. A plurality of longitudinally-oriented, inwardly directed ribs 56 is spaced apart along the interior of the cylindrical side wall 44. The combination of the flared side wall portion 54 and the internal ribs 56 provide maximum flexibility to secure a wide variety of disposable beverage holders (i.e. various sized conventional paper coffee cups and conventional aluminum cans). Additionally, the internal ribs allow condensation release from the cold or hot beverages held within disposable beverage holder when being held by cup 42.

Moreover, the beverage cup holder 12 may further include a plurality of spaced apart, elongated grooves 58 that provide some ease in gripping the circumference of the cylindrical side wall 44.

For appearance and for maintaining the integrity of the magnetic coupling of the ferrous disk within the support collar assembly to the magnetic base, the cup side wall 44 extends past the planar base 46 such that the bottom side wall edge 60 of the cup side wall 44 is in the same horizontal plane H—H as the bottom side wall edge 62 of the support collar assembly side wall 36.

Referring to the alternate cup holder embodiment of FIGS. 19 and 20, the cup holder 12' includes a cup 42' having a substantially cylindrical side wall 44 and a planar base 46, similar to the cup 42 discussed above. Here, however, there are no flared side wall upper portions. To maintain maximum flexibility and resiliency, a pair of spaced apart deep grooves 64 is cut within (or molded into) the cup side wall 44. Similar to the cup embodiment 12, above, a plurality of internally extending ribs 66 aids in maximizing the type of beverage container the cup 42' can hold. In this embodiment, the ribs may be laterally oriented 68 (FIG. 19) or longitudinally oriented 70 (FIG. 20).

As discussed above, the holding devices are typically made of molded plastic. The beverage cup holder 12 is no exception. The beverage cup holder 12 is preferably injection molded with the external side wall 40. It is preferably injection molded of a black or dark, non-reflective color so that when coupled to a magnetic base adhered to an automobile dashboard, the beverage cup holder will not distract the driver by reflecting light. The support collar assembly 34, as discussed above, is also preferably made from a man-made material that is also black or other dark non-reflective color. The one-piece side wall 36 and lip 38 assembly is positioned to seat the ferrous disk is placed atop the side wall 36/lip 38. The side wall 36/lip 38 assembly is adhered to the side wall 40 of the external bottom planar portion of the beverage cup holder. Thus, the ferrous disk is secured within the collar assembly between the base of the beverage cup holder, the side wall 40 of the cup holder, and the collar assembly side wall 36/lip 38. The exposed ferrous disk that is seen from the bottom of the assembled beverage cup holder (from opening 37) may be painted with black paint for a finished appearance and limit exposure to rust. Alternatively, a coating can be used in place of the paint.

Figure 7:
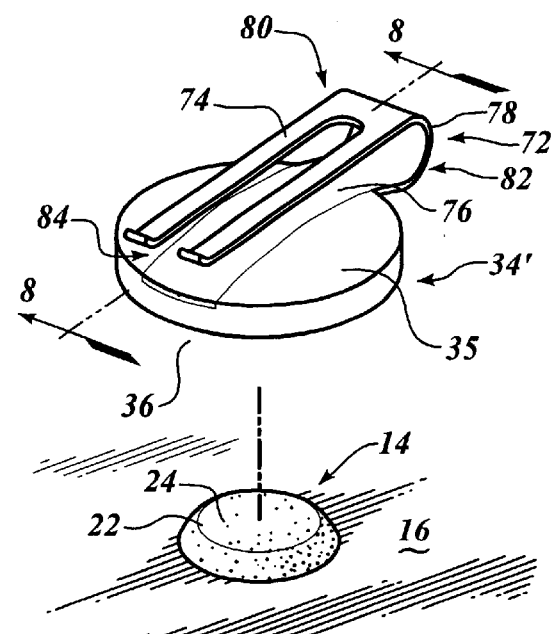
FIG. 7 is a perspective view of a first alternate holding device embodiment having a ferrous disk and alternate support collar assembly.
Figure 8:
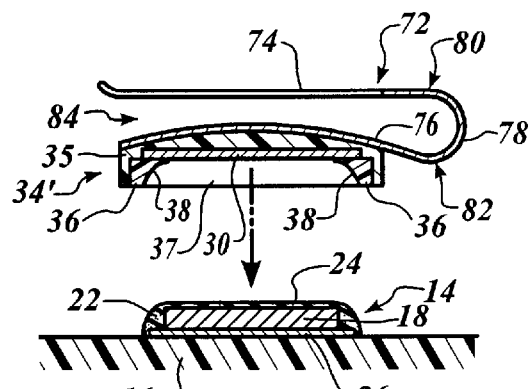
FIG. 8 is a section view taken substantially along lines 8—8 of FIG. 7.

Referring to FIGS. 7–8, a second embodiment holding device is shown. This alternate embodiment is a clipping device 72 having an upper portion 74 and a lower portion 76 and a resilient connector portion 78 that flexibly connects an end 80 of the upper portion 74 to an end 82 of the lower portion 76. The upper portion 74 is substantially aligned with the lower portion 76 to define an open end 84 between the upper portion 74 and the lower portion 76 that is of a size and shape to receive papers and the like. Other conventional clips (paper clip, pronged clips, the clip shown in FIG. 9, etc.) may be used.

This device would appear to be a low profile device. It is unlikely to be relatively heavy, unless the clip is securing a large amount of papers. However, the lack of an external surface of the clip, assuming that the clip is not made of ferrous material as, typically, these kind of clips are made from nonferrous steel, will make quick coupling and uncoupling difficult, as there is not enough surface area to adhere or otherwise fixedly attach a ferrous disk. In this way, a smaller (shallower) support collar 34', such as shown in FIGS. 7 and 8, may more effectively match the magnetic properties of a thin ferrous disk 30 (note that this ferrous disk is thinner than the one in FIGS. 3–5) and the magnetic base 14.

In addition to being shallower, the collar assembly 34' is similar to the support collar assembly 34, discussed above, except that support collar assembly 34' includes an upper surface 35 that covers and secures the ferrous disk within the collar assembly. In other words, the upper surface 35 functions the way the base of the beverage cup holder secures the ferrous disk relative to the beverage cup holder and the collar assembly 34. In this way, the holding device does not need to have a sufficiently large planar portion to cover the ferrous disk during decoupling. As shown in FIG. 7, the lower portion can be adhered to the upper surface 35 of the collar assembly 34'. The upper surface 35 may be curved to better adhere to a nonplanar surface (FIG. 7) or be planar such as shown in FIGS. 9–15 and 19–20. The planar surface may prove to be more accommodating to the largest number of embodiments, thus, making the upper planar surface 35 more economical to manufacture. The alternate embodiment collar assembly can be readily removed from the magnetic base 14 in much the same way that the beverage cup holder is removed from the magnetic base as shown in FIG. 4.

Figure 9:
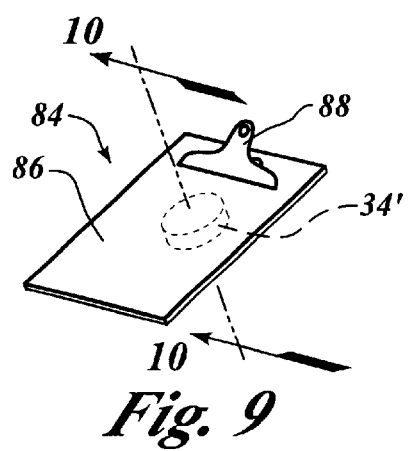
FIG. 9 is a perspective view of a second alternate embodiment holding device showing a clip board.
Figure 10:
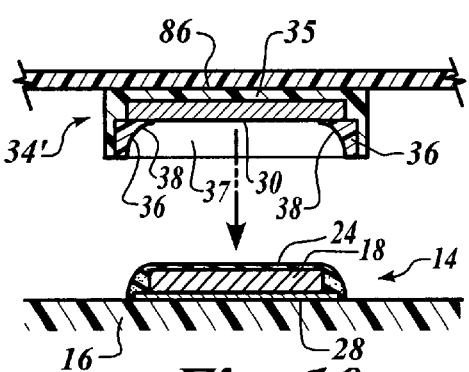
FIG. 10 is a section view taken substantially along lines 10—10 of FIG. 9.

Another alternate embodiment is shown at FIGS. 9 and 10. Here, the third holding device embodiment is a clipboard 84 having a planar base 86 and a fixedly attached clip 88. The clipboard may include either collar assembly 34 or 34', as discussed above. Alternatively, as the clipboard has a low profile, a ferrous disk 30" may be used in place of the support collar assembly if the clipped papers and the like is not too great.

Figure 11:
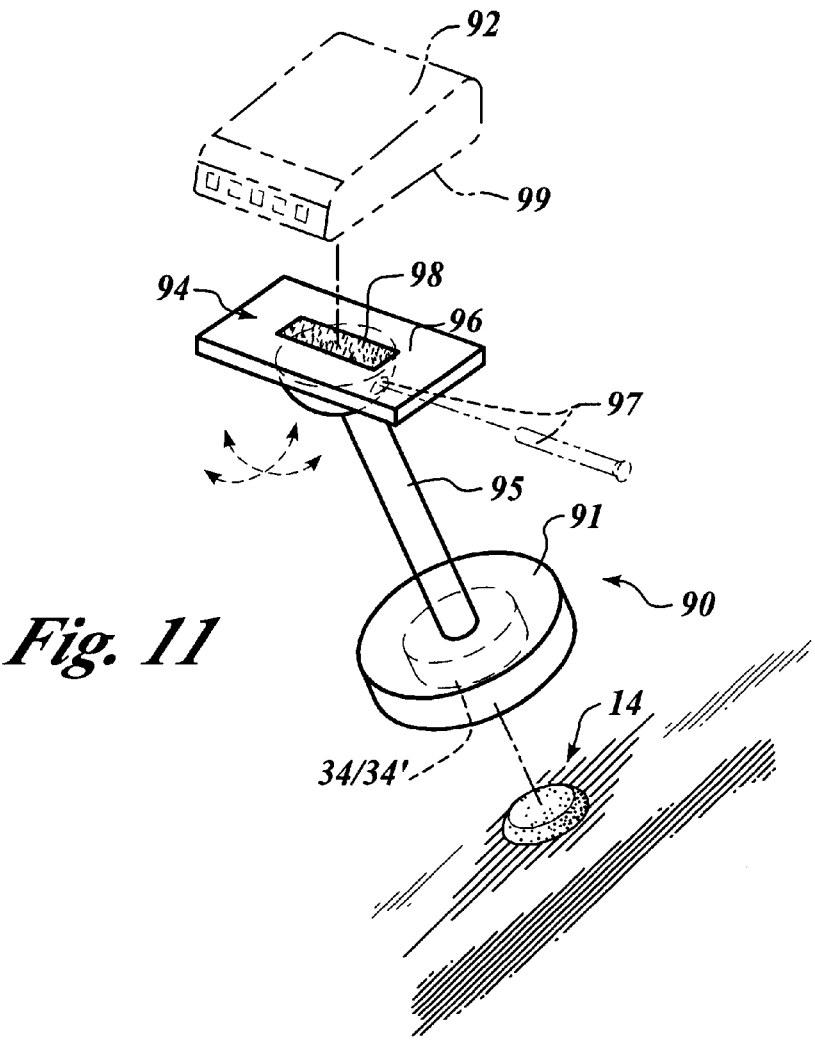
FIG. 11 is a perspective view of a third alternate holding device embodiment holding device showing a radar detector mounting base, with the radar detector shown in phantom.

Referring to FIG. 11, a fourth holding device embodiment is a radar detector holding device 90. Radar detector holding device base 90 includes a base 91 that is fixed attached to a support collar assembly 34 or 34'. In use, the support collar assembly would be coupled to the magnetic base 14 that is adhered to a dashboard of an automobile. A radar detector 92, shown in phantom, may be received onto an upper portion 94 of the radar detector base 91. The upper portion 94 of the radar detector base 91 is hingedly attached to the base 91 through a hinge and pin assembly 97 and an elongated arm 95. The upper portion 94 includes a planar surface 96 in which to abut a lower planar surface of radar detector 92. The arm and hinge and pin assembly allow the planar surface to elevate the radar detector above the dashboard and to position the radar detector in the same plane as the horizon seen from the windshield of the automobile.

The radar detector lower surface 99 may directly mount to the planar surface 96 of the upper portion 94 through conventional adhesive means, including complementary hook and loop fasteners 98, as shown, or a layer of peel-to-expose adhesive (not shown). Alternatively, side rails (also not shown) may extend upwardly from the planar surface 96 to support and hold corresponding side walls of the radar detector 92. In this manner, most conventional radar detectors can be secured to the radar detector base 90 holding device of the present invention.

Figure 12:
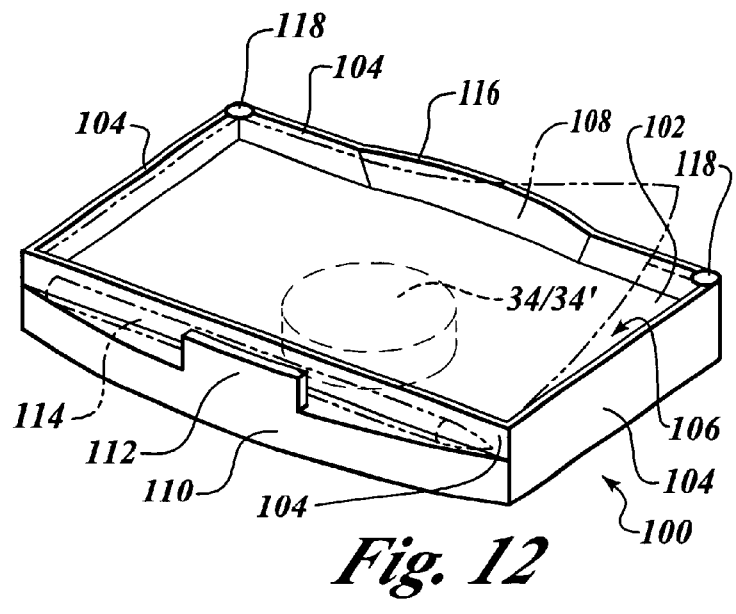
FIG. 12 is a perspective view of a fourth alternate embodiment holding device showing a tray of a size and shape to hold a pen and note paper, of which both are shown in phantom.

FIG. 12 shows a perspective view of another holding device embodiment tray 100. Tray 100 is shown essentially rectangular in shape, although other shapes may be used. In this embodiment, the tray includes a planar bottom wall 102 and spaced apart opposing side walls 104. The side walls and bottom wall define an opening 106 of a size and shape to contain notepaper/easily removed adhesive notes (for example those sold under the 3M POST IT and shown in phantom at 108). Additionally, the tray 100 can be used to hold miscellaneous items, such as keys, coins, or business cards. According to another aspect of the embodiment, one sidewall can be extended to form a ledge 110 with an abutment 112 to hold a writing instrument (shown in phantom at 114). An external indentation 116 in a portion of one of the side walls may also be added to more readily access the notepaper. Tacks 118, which act as abutments, may be added to the tray where one side wall adjoins an adjacent side wall (here, shown at a 90 degree angles) to aid in keeping the notepaper within the tray.

Because of the anticipated weight that the tray is likely to carry, the tray's planar bottom wall is configured to receive support collar assembly 34, similar to the beverage cup holder 12.

Another holding device embodiment is shown in FIG. 13, which is an eyeglasses/sunglasses container 120. Although this holding device can take on many shapes, an opening 128 of a size and shape to contain a pair of eyeglasses/sunglasses (shown in phantom at 122) is defined by a housing. Here, the housing is constructed of a hinged upper portion 124 and an adjoining lower portion 126. In this holding device embodiment, a ferrous disk may be adhered directly to a rear surface of the lower portion 126, such as shown in FIG. 21. Alternatively, and as shown in FIG. 13, a support collar assembly 34 or 34' may be adhered to lower portion 126.

Another holding device embodiment 130 is shown in FIG. 14, which is specifically useful for containing letters (shown in phantom at 138) and the like. The letter carrier 130 includes a base portion 132 with at least two diverging side walls 134 that define at least one slot 136 of a size and shape to hold letters and the like between the diverging side walls 134. Support collar assembly 34/34' may be fixedly attached to an external portion of the base portion 132, as shown. FIG. 14A shows a second embodiment side wall 134' of the letter holding device 130.

Figure 15:
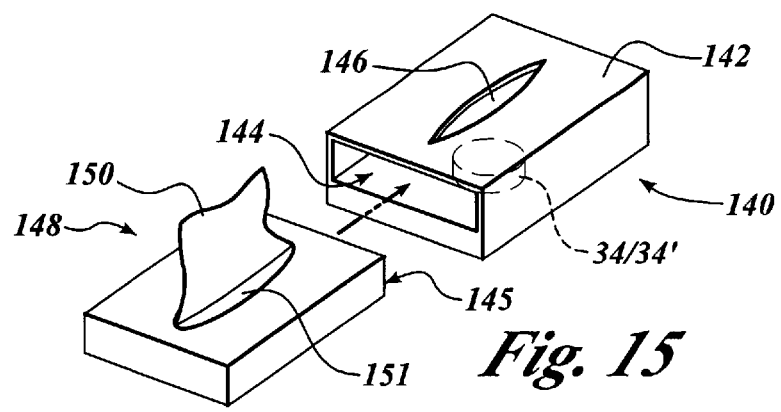
FIG. 15 is a perspective view of a seventh alternate holding device embodiment disclosing a tissue holder with a box of tissue about to be received in the tissue holder.
Figure 16:
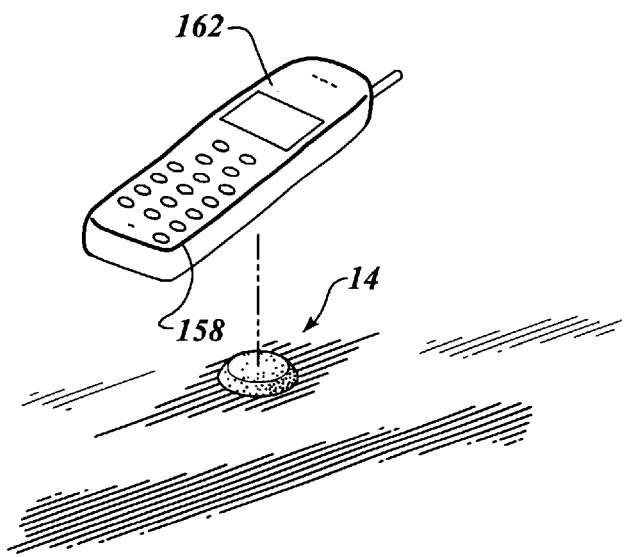
FIG. 16 is a perspective view of a conventional cellular phone being mounted directly to the magnetic base.
Figure 17:
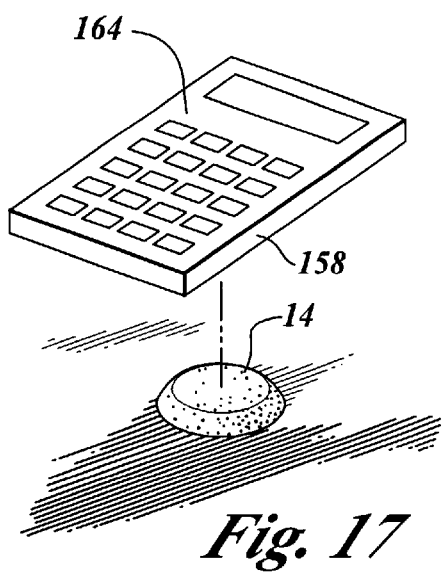
FIG. 17 is a perspective view of a conventional calculator being mounted directly to the magnetic base.

FIG. 15 shows yet another holding device: a tissue box holder 140. The box 140 includes an open end 144 and a slot 146 at its top 142. The open end 144 receives a corresponding end 145 of a tissue box 148. A slot 151 of tissue box 148 corresponds to slot 146 of the tissue box holder to access tissues 150 contained within tissue box 148. The tissue box holder may include the support collar 34, 34' or a ferrous disk 30' or 30" depending on the size of the tissue box.

FIG. 18 shows another holding device 152 of a size and shape to accommodate a personal electronic device such as a hand-held computer, a calculator, a cellular phone, a MP3 digital recorder, a remote control unit, and the like. Although, as mentioned above, the individual personal electronic devices can be mounted directly to the magnetic base 14, 14' through a ferrous disk 30', 30", the holding device 152 may be used for heavy devices or those devices that need to have a buffer from the magnet in the magnetic base to avoid the potential harm of erasing any stored memory in such devices. Additionally, the holding device 152, which includes a base 154 having angled side walls 156 of a size to receive side walls 158 of a personal electronic device (such as the hand-held computer 160 as shown), provides a means for elevating a portion of the personal electronic device for ease in viewing (especially when driving). Although the holding device 152 would typically include a support collar assembly 34, such as discussed above, especially for swivability of the holding device about the magnetic base, an oblong magnetic base 14' with an enlarged ferrous disk 30" may be used to provide additional magnetic strength.

Figure 6:
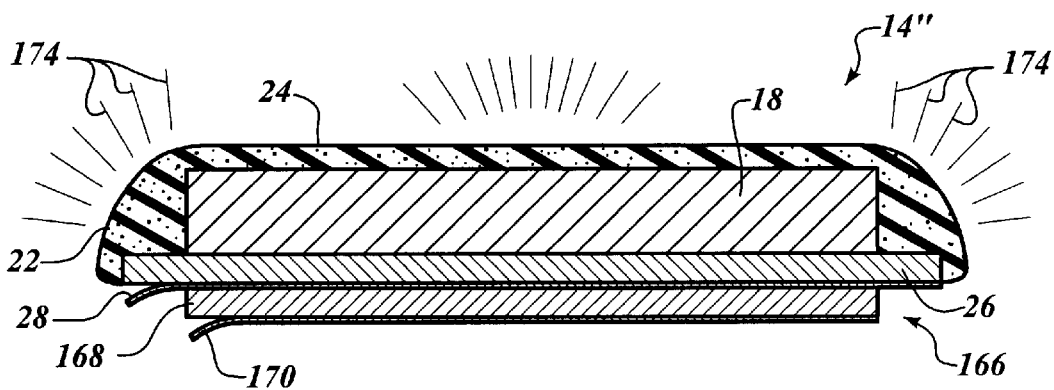
FIG. 6 is an enlarged section view of an alternate embodiment of the magnetic base.

Referring to FIG. 6, the invention also includes an alternate embodiment magnetic base 14". Here, the magnetic base may also include a second ferrous disk assembly 166. The second ferrous disk assembly 166 includes a ferrous disk 168, which may be similar to the one shown at 26 and a protective film 170 that exposes a layer of adhesive when removed. The second ferrous disk assembly 166 is removably adhered to the protective film 28. In this manner, the magnetic base 14" may be sold as a kit. Any nonferrous household holding device or nonferrous object to be held may be magnetically coupled to magnetic base 14' by removing the second ferrous disk assembly from the protective film 28, removing the protective film 170, and applying the now exposed layer of adhesive between protective film 170 and ferrous disk 168 to a clean, dry external surface of the nonferrous household holding device or nonferrous object to be held.

Another embodiment of the present invention includes the addition of glow-in-the-dark illuminescent material 174 to the magnetic base shell 22, or the at least the periphery the magnetic base 14, 14', 14". FIG. 6 is drawn to show a glowing effect from the fluorescent or illuminescent material 174. This is particularly useful if the magnetic coupler is used in low ambient light.

The illustrated embodiments are only examples of the present invention and, therefore, are non-limitive. It is to be understood that many changes in the particular structure, materials, and features of the invention may be made without departing from the spirit and scope of the invention. Therefore, it is the applicant's intention that his patent rights not be limited by the particular embodiments illustrated and described herein, but rather by the following claims interpreted according to accepted doctrines of claim interpretation, including the doctrine of equivalents and reversal of parts.

What is claimed is:

1. A magnetic coupler comprising:
   a magnetic base having an industrial strength magnet where at least the upper portion of the magnet is encased in a low durometer nonferrous shell, said shell including an external surface of a size and shape to engage with a
   corresponding surface of a holding device, said magnetic base including a lower portion being fixedly-attached to a desired surface;
   the holding device being of a size and shape to hold at least one personal object; said holding device including an external surface having a ferrous disk of a size and shape to quickly magnetically couple and quickly uncouple the external surface of the holding device via the ferrous disk with the external surface of the magnetic base, wherein the external surface of the holding device further includes a support collar assembly that is fixedly attached to and external of the external surface of the holding device, said support collar assembly includes at least one side wall fixedly attached to the external surface of the holding device, and a lip that projects inwardly of the side wall to form a ledge within the collar assembly, wherein the lip and the side wall below the lip define an opening, and wherein said opening is of a size and shape to mate with the upper portion of the magnetic base;
   wherein said ferrous disk is of a size and shape to be positioned within the collar assembly with the ferrous disk seated en the ledge within the confines of the side wall between the external surface of the holding device and the ledge;
   wherein the holding device may be quickly and securely coupled to the fixedly-attached magnetic base by placing the opening of the support collar assembly over the upper portion of the magnetic base, thereby magnetically coupling the ferrous disk to the magnet within the magnetic base; and
   wherein the holding device may be quickly uncoupled from the fixedly-attached magnetic base by tilting a portion of the holding device connected to the support collar assembly toward the desired surface to which the magnetic base is adhered, thus, breaking the magnetic bond between the ferrous disk held adjacent the holding device and the magnet in the magnetic base.

2. The magnetic coupler according to claim 1 wherein the external surface of the shell is textured.

3. The magnetic coupler according to claim 1 wherein the shell of the magnetic base has a substantially circular periphery and a frusto-conical upper portion and the support collar assembly is a substantially cylindrical ring with an annular lip projecting inwardly of the ring of a size and shape to substantially correspond to the shape of the shell of the magnetic base.

4. The magnetic coupler according to claim 1 wherein the external surface of the holding device includes an annular ring of a size to encase the ferrous disk and to which said annular ring, the side wall and lip of the support collar assembly is adhered.

5. The magnetic coupler according to claim 1 wherein the holding device includes a cup having a substantially cylindrical side wall and a planar bottom wall defining an opening of a size and shape to receive a beverage container, and wherein the support collar assembly is fixedly attached to the planar bottom wall.

6. The magnetic coupler according to claim 5 wherein an upper portion of the cylindrical side wall flares outwardly of the opening of the cup.

7. The magnetic coupler according to claim 6 wherein the cup further includes at least one internal longitudinal rib that extends inwardly of the substantially cylindrical side wall.

8. The magnetic coupler according to claim 7 wherein the cup further includes a plurality of longitudinally oriented spaced apart grooves on the outside surface of the substantially cylindrical side wall.

9. The magnetic coupler according to claim 5 wherein the cup further includes at least one internal longitudinal rib that extends inwardly of the substantially cylindrical side wall.

10. The magnetic coupler according to claim 9 wherein the cup further includes a plurality of longitudinally oriented spaced apart grooves on the outside surface of the substantially cylindrical side wall.

11. The magnetic coupler according to claim 5 wherein the cup further includes a plurality of longitudinally oriented spaced apart grooves on the outside surface of the substantially cylindrical side wall.

12. The magnetic coupler according to claim 5 wherein the cylindrical side wall extends past the planar bottom wall terminating in substantially the same plane as the side wall of the collar assembly.

13. The magnetic coupler according to claim 5 wherein the cup further includes at least one internal laterally-oriented rib that extends inwardly of the substantially cylindrical side wall.

14. The magnetic coupler according to claim 1, wherein the holding device is a clip having an upper portion and a lower portion and a flexible connector portion that flexibly connects an end of the upper portion to an end of the lower portion such that the upper portion is substantially aligned with the lower portion to define an open end between the upper portion and the lower portion that is of a size and shape to receive papers, and wherein said lower portion is fixedly attached to the support collar assembly.

15. The magnetic coupler according to claim 1 wherein the holding device is a clipboard.

16. The magnetic coupler according claim 1 wherein the holding device is a base member that includes a hingedly-fixed upwardly extending portion having a planar surface, said planar surface is of a size and shape to adhere to an electronic device, and wherein said base member is adhered to the support collar assembly such that the hingedly-fixed upwardly extending portion's planar surface is oppositely situated from the support collar assembly.

17. The magnetic coupler according to claim 16 wherein the electronic device is adherable to the base member's planar surface through one of the following: hook and loop fasteners or a layer of adhesive.

18. The magnetic coupler according to claim 1 wherein the holding device is a tray having a substantially planar bottom wall with at least one side wall defining an opening by and between the bottom wall and the at least one side wall, said opening being of a size and shape to receive notepaper, notepads with removable adhesive, keys, and coins.

19. The magnetic coupler according to claim 18 wherein the at least one side wall includes a partial outwardly flared portion to gain easier access to the tray's contents.

20. The magnetic coupler according to claim 18 wherein the tray includes spaced apart and oppositely opposing side walls to form an essentially rectangle shaped tray, and wherein at least one small abutment is mounted atop of the adjoining side walls at the inherent right angles.

21. The magnetic coupler according to claim 1 wherein the tray further includes a ledge fixedly connected to an external portion of the side wall, said ledge being of a size and shape to hold a writing instrument, said ledge including an abutment in order to keep the writing instrument from lateral movement.

22. The magnetic coupler according to claim 1 wherein the holding device is an eyeglass holder.

23. The magnetic coupler according to claim 1 wherein the holding device is a base member having at least two upwardly extending portions defining a slot between the two extending portions, and wherein said slot is of a size and shape to hold at least one letter.

24. The magnetic coupler according to claim 1 wherein the holding device is a tissue box holder.

25. The magnetic coupler according to claim 1 wherein the holding device includes a support base having a pair of spaced apart and oppositely situated, upwardly extending side walls, said support base and side walls define an opening of a size and shape to receive and hold a personal electronic device.

26. The magnetic coupler according to claim 25 wherein the side walls form abutments to receive and hold corresponding sidewalls of the personal electronic device.

27. The magnetic coupler according to claim 25 wherein the side walls are positioned to receive and hold the personal electronic device in an upwardly angled position.

28. The magnetic coupler according to claim 25 wherein the personal electronic device is one of the following: a hand held computer, a cellular phone, a MP3 recorder, a calculator, or a remote control unit.

29. The magnetic coupler according to claim 1 wherein the thickness of the ferrous disk is in the range of 30/1000" to 70/1000".

30. The magnetic coupler according to claim 1 wherein the magnet is at least a 2.0 Gauss magnet.

31. A magnetic coupler comprising:
a magnetic base having an industrial strength magnet where at least the upper portion of the magnet is encased in a low durometer nonferrous shell, said shell including an external surface of a size arid shape to engage with a corresponding surface of a holding device, said magnetic base including a lower portion being fixedly-attached to a desired surface;
the holding device being of a size and shape to hold at least one personal object; said holding device including an external surface having a ferrous disk of a size and shape to quickly magnetically couple and quickly uncouple the external surface of the holding device via the ferrous disk with the external surface of the magnetic base, wherein the magnetic base further includes a planar ferrous disk that is positioned underneath the magnet with the shell encasing the magnet and a least the periphery of the planar ferrous disk.

32. The magnetic coupler according to claim 31 wherein the holding device include a cup having a substantially cylindrical side wall and a planar bottom wall defining an opening of a size and shape to receive a beverage container.

33. The magnetic coupler according to claim 31 wherein the holding device is a clipboard.

34. The magnetic coupler according to claim 31 wherein the holding device is a base member that includes a hingedly-fixed upwardly extending portion having a planar surface, said planar surface is of a size and shape to adhere to an electronic device.

35. The magnetic coupler according to claim 31 wherein the holding device is a tray having a substantially planar bottom wall with at least one side wall defining an opening by and between the bottom wall and the at least one side wall, said opening being of a size and shape to receive notepaper, notepads with removable adhesive, keys, and coins.

36. The magnetic coupler according to claim 31 wherein the holding device is an eyeglass holder.

37. The magnetic coupler according to claim 31 wherein the holding device is a base member having at least two upwardly extending portions defining a slot between the two extending portions, and wherein said slot is of a size and shape to hold at least one letter.

38. The magnetic coupler according to claim 31 wherein the holding device is a tissue box holder.

39. The magnetic coupler according to claim 31 wherein the holding device includes a support base having a pair of spaced apart and oppositely situated, upwardly extending side walls, said support base and side walls define an opening of a size and shape to receive and hold a personal electronic device.

40. The magnetic coupler according to claim 39 wherein the personal electronic device is one of the following: a hand held computer, a cellular phone, an MP3 recorder, a calculator, or a remote control unit.

41. A magnetic coupler kit comprising:
a magnetic base having an industrial strength magnet where at least the upper portion of the magnet is encased in a low durometer nonferrous shell, said shell including an external surface of a size and shape capable of engaging a corresponding surface of a holding device, said magnet including a lower portion being capable of being fixedly-attached to a desired surface; said magnetic base further including a planar first ferrous disk that is positioned underneath the magnet with the shell encasing the magnet and at least the periphery of the ferrous disk, and wherein said ferrous disk includes a removable protective film layer that sandwiches a layer of adhesive between the ferrous disk and the protective film layer;
and a ferrous disk assembly having a second ferrous disk removably adhered to a lower planar surface of the first ferrous disk and a second removable protection film layer on the opposite planar surface from the first ferrous disk, said second protection film layer sandwiches a second layer of the adhesive between the second ferrous disk and the second protective film layer.

* * * * *